US011727385B2

(12) United States Patent
Zeitoun

(10) Patent No.: US 11,727,385 B2
(45) Date of Patent: Aug. 15, 2023

(54) MULTI-BILLER PAYMENT SYSTEMS AND METHODS

(71) Applicant: NCR Corporation, Duluth, GA (US)

(72) Inventor: Jean-Marc Zeitoun, Vincennes (FR)

(73) Assignee: NCR Corporation, Atlanta, GA (US)

( * ) Notice: Subject to any disclaimer, the term of this patent is extended or adjusted under 35 U.S.C. 154(b) by 475 days.

(21) Appl. No.: 14/751,469

(22) Filed: Jun. 26, 2015

(65) Prior Publication Data

US 2016/0379204 A1 Dec. 29, 2016

(51) Int. Cl.
G06Q 20/30 (2012.01)
G06Q 20/32 (2012.01)

(52) U.S. Cl.
CPC ............... G06Q 20/3276 (2013.01)

(58) Field of Classification Search
USPC ...................................... 705/40, 35
See application file for complete search history.

(56) References Cited

U.S. PATENT DOCUMENTS

| 2010/0211499 A1* | 8/2010 | Zanzot | G06Q 20/10 705/40 |
| 2012/0130889 A1* | 5/2012 | Lyons | G06Q 20/3272 705/39 |
| 2012/0209749 A1* | 8/2012 | Hammad | G06Q 30/06 705/27.1 |
| 2013/0067235 A1* | 3/2013 | Anson | G06Q 20/3223 713/186 |
| 2014/0006184 A1* | 1/2014 | Godsey | G06Q 20/08 705/16 |
| 2015/0039517 A1* | 2/2015 | Liberty | G06Q 20/123 705/67 |
| 2015/0106215 A1* | 4/2015 | Craig | G06Q 20/202 705/17 |

OTHER PUBLICATIONS

Nov. 8, 2006 Bill Paying by Mobile Phone Using Barcode Capture NTT Data.*
Wyoming Community bank FAQ (Year: 2014).*

* cited by examiner

Primary Examiner — William E Rankins
(74) Attorney, Agent, or Firm — Schwegman, Lundberg & Woessner

(57) ABSTRACT

Various embodiments herein each include at least one of systems, methods, and software for electronic transaction processing. One embodiment includes a method that may be performed by a server includes maintaining a database of payee accounts. A payee account may include at least a payee identifier and a payee bank account identifier. This method further includes decrypting code data including at least a payee identifier received from a node over a network via a network interface. The method may then retrieve a payee bank account identifier from the database based on the decrypted payee identifier and transmit a form of the payee bank account identifier to the node over the network via the network interface device. Some such embodiments include a single server, which may actually be multiple servers operating jointly, that provide such services for multiple payees.

8 Claims, 5 Drawing Sheets

MULTI-BILLER PAYMENT SYSTEMS AND METHODS

BACKGROUND INFORMATION

Transaction processing is a significant expense to many enterprises, such as merchants, utility companies, financial institutions, and the like. Bankcard payments, such as credit and debit card payments, are commonly charged at rates, which can reach upwards of three-percent (3%) of the payment amount. Further, it is possible that direct debit payments can be repudiated by payors at any time during lengthy repudiation periods, such as eight weeks or even 90 days. Additionally, receiving payments by check or direct debit run the risk of payments, such as checks, being returned due to insufficient funds and account closures. Processing returned checks and repudiated payments adds significant cost in terms of money and resources to payment processing efforts. Thus, current payment systems are not only expensive, they also involve risk.

SUMMARY

Various embodiments herein each include at least one of systems, methods, and software for electronic transaction processing and more particularly, multi-biller payment systems and methods. Some embodiments provide an entity with an ability to provide customers an option to make payments by scanning 2D barcodes or QR Code with a camera of a computing device, such as a mobile phone or tablet device, to obtain code data that is at least partially encrypted. An application or app on the computing device then forwards at least a portion of the code data to a linking process on a server that decrypts the data and sends clear text back to the computing device. The computing device then presents a view of the code data, which may include an amount due for a bill, or other purchase, and a logo of the biller. The view also typically includes an input field to modify the amount of a payment to be made and a user interface control to make the payment, if partial payment is accepted. As the code data received by the application includes a payee identifier and the application is typically provided by a bank or other financial institution or payment processor that has access to funds in a bank account of the customer, a "credit transfer" payment may then be made initiated by the customer to the entity.

One embodiment in the form of a method performed on a computing device under control of a customer includes transmitting, via a network interface device to a linking process on a server, code data received as input into an app that executes on a computing device. This method further includes receiving, via the network interface device from the linking process, data including at least one of a payee identifier, a transaction identifier, an amount payable, and a currency identifier. The method may then present at least a portion of the received data and receive input including at least a payment amount and a command to transmit a payment instruction to a payment processor. An instruction is then transmitted to the payment processor in response to a received command, including the payee identifier, the transaction identifier, a payment amount received as input, and a currency identifier.

Another method embodiment that may be performed by a server, such as a server that may provide a linking service, includes maintaining a database of payee accounts. A payee account may include at least a payee identifier and a payee bank account identifier. This method further includes decrypting code data including at least a payee identifier received from a node over a network via a network interface. The method may then retrieve a payee bank account identifier from the database based on the decrypted payee identifier and transmit a form of the payee bank account identifier to the node over the network via the network interface device.

A further embodiment in the form of a system includes at least one processor, at least one memory device, and a network interface device. The at least one memory device stores an instruction set executable by the at least one processor to perform data processing activities. The data processing activities may include decrypting code data received from a node via the network interface device where the code data includes at least a payee identifier. The data processing activities further include retrieving a payee bank account identifier from a database based on the decrypted payee identifier. The database typically stores at least payee account data including at least a payee identifier and a payee bank account identifier with regard to each payee account. The data processing also include transmitting a form of the payee bank account identifier to the node via the network interface device.

DETAILED DESCRIPTION

Figure 1:
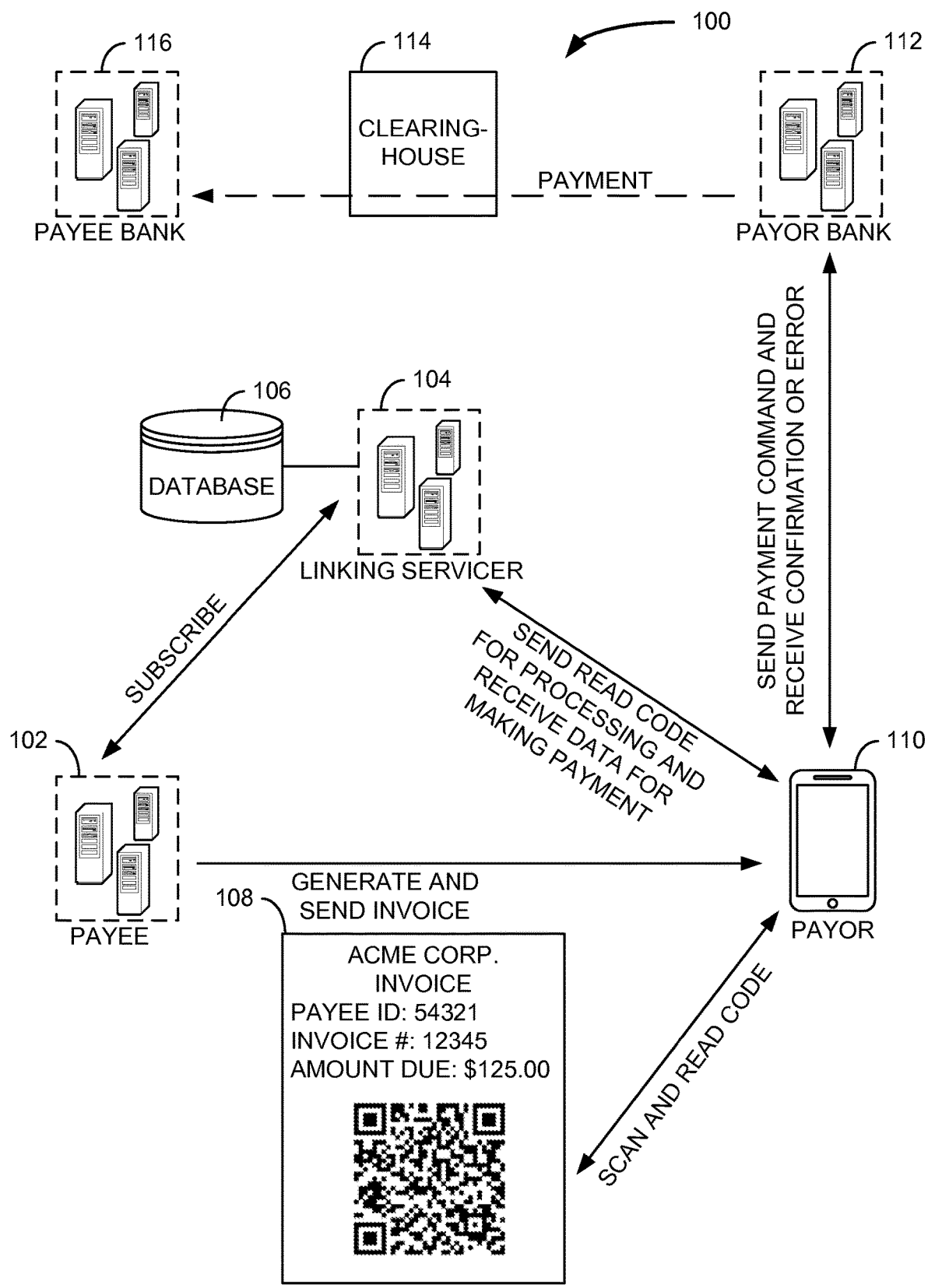
FIG. 1 is a logical block diagram of a system and an operation flow, according to an example embodiment.

Various embodiments herein each include at least one of systems, methods, and software for electronic transaction processing. Some embodiments provide an entity with an ability to provide customers an option to make payments by scanning barcodes with a camera of a computing device, such as a mobile device utilized to capture an image of a barcode (e.g., a QR code) to obtain code data. The code data may be at least partially encrypted in some embodiments. In some embodiments, an application or app on the computing device utilized to capture the barcode reads the barcode to obtain code data and then forwards at least a portion of the code data to a linking process on a server. The linking process links the code data to a payee that issued the barcode, which may include decrypting the code data and sends clear text back to the computing device. The code data typically includes a plurality of a payee identifier, a transaction identifier such as an invoice or bill number, an amount payable, and a currency of the amount payable. The computing device then presents a view of the code data, which may include the amount payable and a logo of the biller. The view also typically includes an input field to receive an amount of a payment to be made, such as for making a partial payment or even an extra payment, and a user interface control to make the payment, such as a button or selectable link. As the code data received by the application includes a payee identifier and the application is typically provided by a bank or other financial institution or payment processor that has access to funds in a bank account of the customer, a payment may then be made by the customer to the entity.

In some embodiments, the payment may be made by the financial institution of the customer as a Single Euro Payments Area (SEPA) Credit Transfer (SCT). Such a payment is a non-repudiable payment according to SEPA laws, regulations, and rules. In other embodiments, the payment may be made as an Automated Clearing House (ACH) type payment, a wire transfer, account-to-account fund transfer between accounts maintained with a single financial institution, and the like.

Transactions conducted according to some such embodiments secure payee (i.e., a payment beneficiary) bank account numbers from being revealed to the payor (i.e., the customer). Conversely, some such embodiments also secure payor bank account numbers from being revealed to payees. The bank account numbers are secured in some embodiments through a linking server that possesses a payor bank account number that is revealed only to the payor bank or a clearinghouse involved in processing a payment. The payee bank account number may be provided to the payor bank or the clearinghouse through secure data communications with the linking server to retrieve the payee account number in some embodiments. In other embodiments, the payee bank account number may be provided to the payor application or app only in an encrypted form that is never presented to the payor and can be decrypted only by the payor bank or a clearinghouse involved in processing the payment. The payor bank account number in some embodiments is communicated only between the payor application or app and the payors banking system. The payor bank account number is generally not relevant to the payee or the linking server as the payment, when made, will be transmitted along with either a transaction identifier generated by the payee with regard to an invoice or bill or a payor account number with the payee. This data allows the payee to associate the payment with the proper bill, invoice, or customer account.

Thus, such embodiments provide enhanced security over other modes of payment as neither payor or payee bank account numbers are revealed. Further, such payments being non-repudiable reduce risks associated with checks, direct debit, and other such payment forms. Additionally, the cost associated with processing such credit transfer type payments, while not free, avoids considerable expense involved in receiving bankcard payments and in operating check-processing or Giro-processing functions.

These and other embodiments are described herein with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, security, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a logical block diagram of a system 100 and an operation flow, according to an example embodiment. The system 100 is an example of an electronic transaction processing system and electronic transaction processing flow.

The system 100 includes computing resources of a payee 102 that is to receive payments from payors via a payor computing device, such as a payor mobile device 110. The system 100 also includes computing resources of a linking servicer 104, which typically also include at least one database 106. The system 100 further includes computing resources of a payor bank 112, which is a bank at which the payor 110 maintains a bank account from which payments flow to the payee 102. The system 100 further includes a payee bank, which is a bank at which the payee 102 maintains a bank account into which payments will flow from the payor 110. Some embodiments may further include computing resources of a clearinghouse that is involved in processing and clearing payments between the payor bank 112 and the payee bank 116, depending on a payment type of the particular embodiment or payment being made.

Through use of the linking servicer 104, payees 102 are able to generate and send invoices or bills, such as invoice 108, that include a code that when accessed by an app or application of the payor 110, facilitates electronic payment of the invoices. In a typical embodiment, the payee 102 subscribes to services of the linking servicer 104. To subscribe, the payee 102 establishes an account with the linking servicer 104 and the linking servicer 104 assigns the payee 102 a payee identifier. The payee identifier may be an identifier of one or more records stored in the database 106. The one or more records stored in the database 106 associated with the payee identifier include a payee bank 116 account identifier, such as one or more of an account number, an International Bank Account Number (IBAN), a bank routing number and account number, and the like. In some embodiments, the one or more records stored in the database 106 also include payee data, such as contact information, a contact person, address, tax identification numbers, the logo of the biller, and other such information. In some embodiments, the database 106 may also store payee 102 account usage tracking data and may provide secured access to payee 102 data. These and some other embodiments also include payee 102 account configuration data, such as data that indicates one or more of whether a payee 102 will accept partial payments for less than an amount due, payments for more than is due, a minimum payment amount that will be accepted, currencies that will be accepted, and the like.

Once the payee 102 has subscribed to services of the linking servicer 104, the payee 102 can generate payment documents 108, such as invoices, that enable payors 110 to invoke the linking servicer 104 payment services. When the payee 102 generates payment documents 108, whether in paper or electronic form, a code is generated with regard to a payment document 108. The code may be a barcode, such as a QR Code, a hyperlink, or other code in various embodiments. A generated code typically includes the payee identifier assigned by the linking servicer, a transaction identifier such as an invoice number or a payor account number, and an amount payable, which comes from the amount due for the payment document 108. The code may also include data identifying a currency type to be used in making a payment with regard to the payment document 108. The code is then added to the payment document 108 and the payment document 108 is sent to the payor 110. Except the Payee Identifier, all the other data contained in the QR Code may be encrypted with a public key that only the linking Servicer 104 can decrypt with the corresponding private key.

In some embodiments, when a payee 102 generates a payment document including a code, a data record may be added to the database 106 of the linking servicer 104 that includes data about the payment document. This data record may include some or all of data identifying the payee 102, the payor 110, an amount due, a due date, a payment amount received and a date received, and other data. The payee 102 may then access this data stored in the database 106 to track payments that have been made, when funds of payments will be deposited in the payee bank 116, view analytics with regard to this data that may be accessed view the linking servicer 104, and otherwise access the data records and reports generated therefrom. Note that in other embodiments, such a data record may not be added to the database 106 until the payor 110 scans a code added to a payment document and that data is received by the servicer 104.

Payee 102 usage of services of the linking servicer 104 may be charged in different ways in various embodiments. For example, in some embodiments, payee 102 usage may be pre-paid for a number of transactions and the number is decremented upon creation of a data record in the database 106 with regard to a payor 110 payment, which may or may not have been received. In other embodiments, a number of data records generated in the database 106 may be counted and the payee 102 post-billed. Other embodiments may be pre or post billed based on other factors, such as a total amount billed, a total payment amount received, and the like. Some of these embodiments or others may also take into account other factors, such as discounts for a volume of usage in terms of one or both of data records, number of payments received, a total amount of payments received or billed, and the like.

The payor 110, upon receipt of the payment document 108, may then initiate a payment with regard to the payment document 108 through the code included therein. When the payment document 108 is an electronic document, the code may be a selectable hyperlink or other document element that can be selected to cause a view of a payment user interface to be presented. Such a payment user interface may be a user interface of an online banking application, app, or website. The payee 110 may be prompted to select a banking entity and to login to the relevant app, application, or website to continue. When the payment document 108 is a paper document, the user may image a barcode included on the payment document 108. The barcode may be imaged by a camera of a mobile device, such as a smartphone or tablet device, within a mobile banking application of the payor bank 112. Regardless of how the code is invoked or the means for accessing the payment user interface, the code data is read. In some embodiments, a portion of the code data is encrypted. The encrypted data is then transmitted over a network to the computing resources of the linking servicer 104.

The computing resources of the linking servicer 104 decrypts the code data to obtain the payee identifier, the transaction identifier, the amount payable, and the currency type, if included therein. This code data is then transmitted back to the payor 110 computing device. The payor 110 computing device then presents a view of the code data within a user interface, such as the user interface 202 illustrated within FIG. 2.

In some embodiments, the linking servicer 104, upon decrypting the code data, may add data to the database 106 in some embodiments to track the payor 110 access activity. This may include adding a data record to the database 106 when such a data record was not created at a time when the payee 102 created the respective payment document. Each data record may also include a status in some embodiments. The status may be updated by the linking servicer 104 based on payor 110 activity with regard to the billing document via the solutions described herein, such as viewing the data, making a full or partial payment, a rejection of payment initiate due to insufficient funds, and the like.

Figure 2:
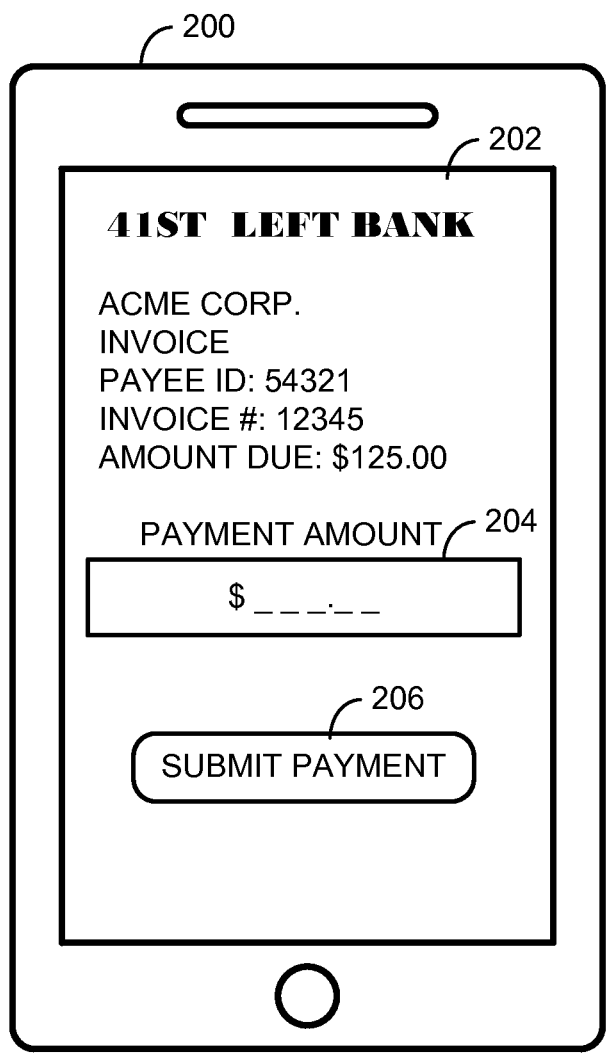
FIG. 2 is a user interface illustration, according to an example embodiment.

Referring briefly to FIG. 2, FIG. 2 is a user interface 202 illustration, according to an example embodiment. The user interface 202 presents at least a portion of the code data with a display of a computing device 200, such as a mobile device. The presented data may identify the payee 102, the payment document 108 type, the transaction identifier, the logo of the payee 102, and the amount due. The presented data may be data that was read from the code in clear text, received from the computing resources of the linking servicer 104, or otherwise retrieved from memory of the computing device 200 or from a network location. The user interface 202 further includes a payment amount control 204 within which an amount of a payment to be made is entered and a submit payment button 206. In other embodiments, the user interface 202 may include more or less information and controls.

The payor 110 may enter an amount to be paid within the payment amount control 204, which may be more or less than the amount due, and then select the submit payment button 206. A payment command may then be transmitted to the payor bank 112 of FIG. 1. The payment command includes the payee identifier, the transaction identifier, the payment amount received as input, and may also include a currency-type identifier. In some embodiments, the payment command may also include a bank account identifier of the payor 110, such as when the payor 110 has multiple bank accounts at the payor bank 112. In further embodiments, the payment command may include a payee 102 bank account number in cypher text. In some embodiments, some or all of this data, except for the payor 110 bank account data, may also be transmitted to the linking servicer 104. The linking servicer 104 may then store this data in proper data records in the database 106 to allow the payee 102 to view and track data of payments that have been made as described above. The linking servicer 104, in some such embodiments, may also maintain a status with regard to each data record such as paid in full, paid in part, canceled, insufficient funds, and other statuses depending on the embodiment. Thus, when payments are made or a data record is accessed, a status of a data record may be updated.

Returning now to FIG. 1, the payor bank 112, upon receipt of the payment command, will verify the payor 110 bank account has sufficient funds to make the requested payment. When there are not sufficient funds, an error message may be returned and presented to the payor 110. When there are sufficient funds, the payment will then be processed by the payor bank 112 and a confirmation will be transmitted to the payor 110. The payor bank 112 process the payment accordingly, which may involve the clearinghouse 114 and the funds are eventually received by the payee bank 116 and deposited into the payee's 102 bank account. The payee bank 116, and eventually the payee 102, receives sufficient data to associate the payment to at least one of the proper payor 110 account and transaction (e.g., payor 110 account number with the payee 102, transaction identifier included in the code data, etc.).

Figure 3:
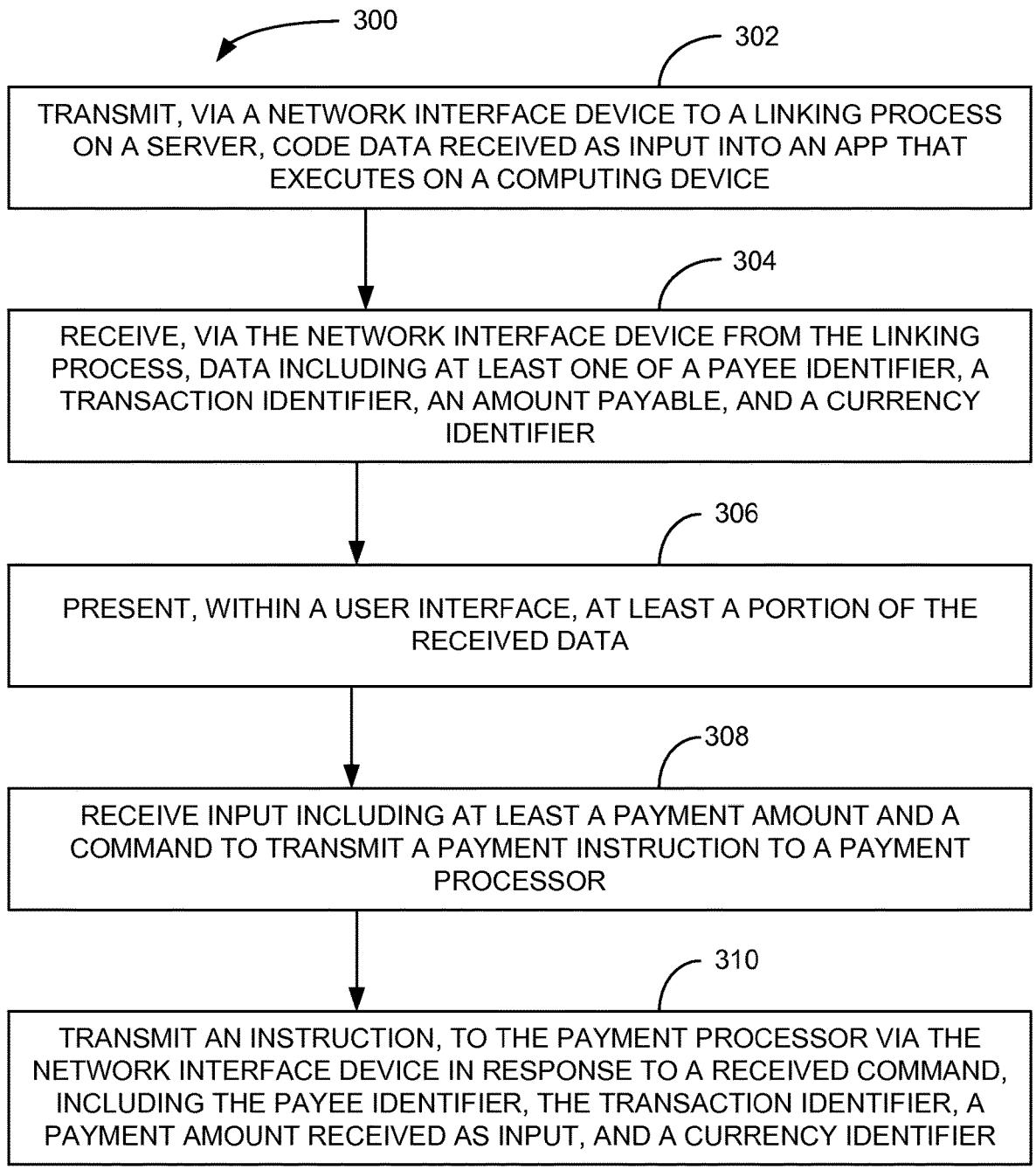
FIG. 3 is a block flow diagram of a method, according to an example embodiment.

FIG. 3 is a block flow diagram of a method 300, according to an example embodiment. The method 300 is an example of a method that may be performed by a mobile device app that executes on a mobile device, such as a smartphone, tablet, smartwatch, and the like.

The method 300 includes transmitting 302, via a network interface device to a linking process on a server, code data received as input into an app that executes on a computing device. The method further includes receiving 304, via the network interface device from the linking process, data including at least one of a payee identifier, a transaction identifier, an amount payable, and a currency identifier and may also include receiving a logo image of the payee 102 that may be subsequently presented within a user interface. The payee identifier may be a bank account number of the payee secured in an encrypted form or other identifier. The method 300 may then present 306, within a user interface, at least a portion of the received data, which may include the logo image in some embodiments, and receive 308 input including at least a payment amount and a command to transmit a payment instruction to a payment processor, such as a bank or other financial institution. The method 300 may next transmit 310 an instruction, to the payment processor via the network interface device in response to a received command, including the payee identifier, the transaction identifier, a payment amount received as input, and a currency identifier.

In some embodiments of the method 300, receiving the code data as input into the computing device includes receiving a digital image from a camera of or coupled to the computing device. The image in such embodiments includes a barcode. The method 300 may then decode the barcode to obtain code data encoded within the barcode.

In some further embodiments of the method 300, the code data received as input includes at least some encrypted data. In such embodiments, the data received from the linking process includes clear text of the encrypted data as decrypted by the linking process.

In some embodiments, the method 300 further includes receiving, from the linking process, one of a confirmation the payment instruction has been successfully processed and an error message indicating the payment was not successfully processed. In some such embodiments, the error message includes data indicating the payor bank account contains insufficient funds to make the payment in the amount received as input. A message may then be presented to the including a representation of the error message.

In some embodiments, the payment instruction is an instruction to the payment processor to authorize a SEPA credit transfer from a payor bank account to a payee bank account. The instruction is formed in some embodiments such that when the payment is processed, the payee receives the transaction identifier and a payment of at least a portion of the payment amount received as input in a denomination of the currency identifier.

Figure 4:
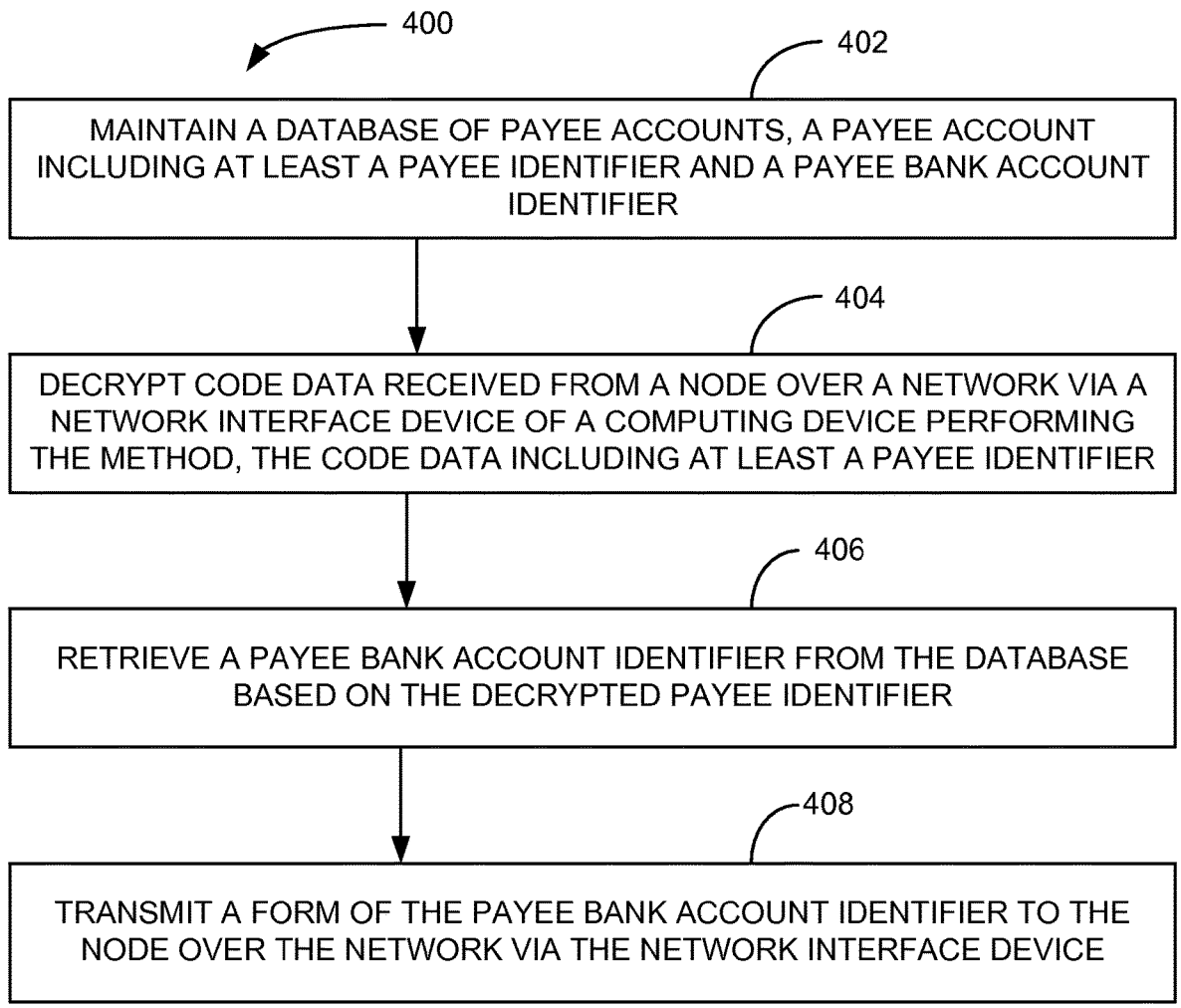
FIG. 4 is a block flow diagram of a method, according to an example embodiment.

FIG. 4 is a block flow diagram of a method 400, according to an example embodiment. The method 400 is an example of a method that may be performed on one or more server computers of a linking servicer.

The method 400 includes maintaining 402 a database of payee accounts. A payee account typically includes at least a payee identifier and a payee bank account identifier. The method 400 further includes decrypting 404 code data received from a node over a network including at least a payee identifier. The method may then retrieve 406 a payee bank account identifier from the database based on the decrypted payee identifier and transmitting 408 a form of the payee bank account identifier to the node over the network via the network interface device.

In some embodiments, the form of the payee bank account identifier transmitted 408 to the node is a payee identifier that a payment processor utilizes to retrieve an actual payee bank account identifier from the database via a network service of the computing device performing the method. In some such embodiments, the method 400 further includes receiving, from an authenticated payment processor process over the network, a payee identifier in an encrypted form and decrypting the payee identifier. The method 400 may then retrieve the payee bank account identifier from the database based on the decrypted payee identifier and transmit the payee bank account identifier to the authenticated payment processor.

In another embodiment of the method 400, the decrypted 404 code data further includes a transaction identifier, an amount, and a currency identifier. Such embodiments may also include transmitting the transaction identifier, the amount, and the currency identifier to the node.

The Linking Servicer also includes a database of the transactions that have been initiated successfully or not by the method.

Any Payee can get a web secure access to this transactions database concerning its own transactions and can make some extractions and statistics.

Figure 5:
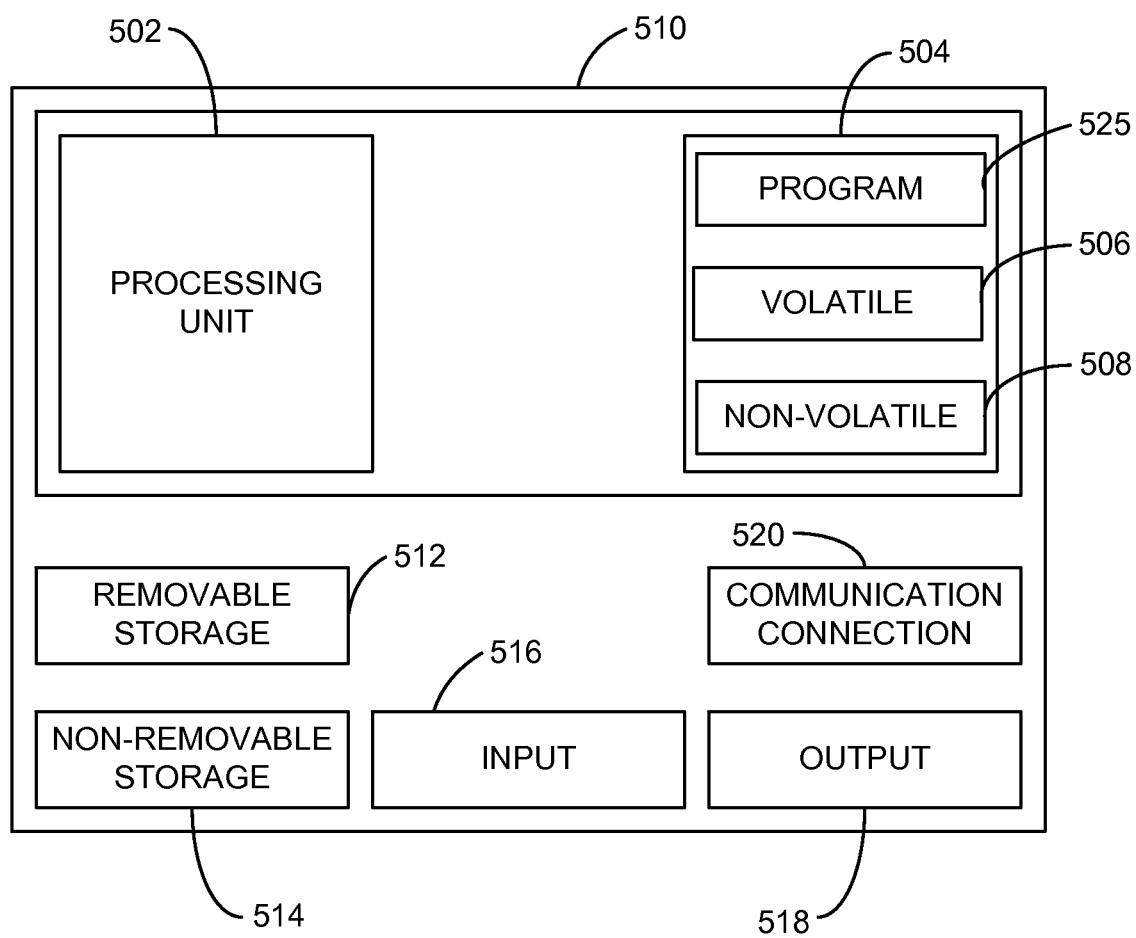
FIG. 5 is a block diagram of a computing device, according to an example embodiment.

FIG. 5 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 510, may include a processing unit 502, memory 504, removable storage 512, and non-removable storage 514. Although the example computing device is illustrated and described as computer 510, the computing device may be in different forms in different embodiments. For example, the computing device may instead be a smartphone, a tablet, smartwatch, or other computing device including the same or similar elements as illustrated and described with regard to FIG. 5. Devices such as smartphones, tablets, and smartwatches are generally collectively referred to as mobile devices. Further, although the various data storage elements are illustrated as part of the computer 510, the storage may also or alternatively include cloud-based storage accessible via a network, such as the Internet.

Returning to the computer 510, memory 504 may include volatile memory 506 and non-volatile memory 508. Computer 510 may include—or have access to a computing environment that includes a variety of computer-readable media, such as volatile memory 506 and non-volatile memory 508, removable storage 512 and non-removable storage 514. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 510 may include or have access to a computing environment that includes input 516, output 518, and a communication connection 520. The input 516 may include one or more of a touchscreen, touchpad, mouse, keyboard, camera, one or more device-specific buttons, one or more sensors integrated within or coupled via wired or wireless data connections to the computer 510, and other input devices. The computer 510 may operate in a networked environment using a communication connection 520 to connect to one or more remote computers, such as database servers, web servers, and other computing device. An example remote computer may include a personal computer (PC), server, router, network PC, a peer device or other common network node, or the like. The communication connection 520 may be a network interface device such as one or both of an Ethernet card and a wireless card or circuit that may be connected to a network. The network may include one or more of a Local Area Network (LAN), a Wide Area Network (WAN), the Internet, and other networks. In some embodiments, the communication connection 520 may also or alternatively include a transceiver device, such as a BLUETOOTH® device that enables the computer 510 to wirelessly receive data from and transmit data to other BLUETOOTH® devices.

Computer-readable instructions stored on a computer-readable medium are executable by the processing unit 502 of the computer 510. A hard drive (magnetic disk or solid state), CD-ROM, and RAM are some examples of articles including a non-transitory computer-readable medium. For example, various computer programs 525 or apps, such as one or more applications and modules implementing one or more of the methods illustrated and described herein or an app or application that executes on a mobile device or is accessible via a web browser, may be stored on a non-transitory computer-readable medium.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
   transmitting, via a network interface device to a linking process on a server, code data received as input into an app that executes on a computing device, the code data including a payee identifier enabling tracking of a payment;
   receiving, via the network interface device from the linking process, data including a payee bank account number in an encrypted form, a transaction identifier, an amount payable, and a currency identifier;
   presenting, within a user interface, at least a portion of the received data and receiving input including at least a payment amount and a command to transmit a payment instruction to a payment processor; and
   transmitting the payment instruction, to the payment processor via the network interface device in response to a received command, including the payee bank account number in the encrypted form, the transaction identifier, a payment amount received as input, and a currency identifier.

2. The method of claim 1, wherein receiving the code data as input into the computing device comprises:
   receiving a digital image from a camera of or coupled to the computing device, the image including a barcode; and
   decoding the barcode to obtain code data encoded within the barcode.

3. The method of claim 2, wherein the computing device is a mobile computing device.

4. The method of claim 3, wherein the payment processor is a bank and the app is a mobile banking app of the bank.

5. The method of claim 1, wherein:
   the code data received as input includes at least some encrypted data; and
   the data received from the linking process includes clear text of the encrypted data as decrypted by the linking process.

6. The method of claim 1, further comprising:
   receiving, from the linking process, one of:
   a confirmation the payment instruction has been successfully processed; and
   an error message indicating the payment was not successfully processed.

7. The method of claim 6, wherein:
   the error message includes data indicating the payor bank account contains insufficient funds to make the payment in the amount received as input.

8. The method of claim 1, wherein the payment instruction is an instruction to the payment processor to authorize a Single Euro Payments Area (SEPA) credit transfer from a payor bank account to a payee bank account such that when the payment is processed, the payee receives the transaction identifier and a payment of at least a portion of the payment amount received as input in a denomination of the currency identifier.

* * * * *